(12) United States Patent
Wang et al.

(10) Patent No.: US 11,880,027 B2
(45) Date of Patent: Jan. 23, 2024

(54) HIGH-SPEED STEREO 3D MULTIMODAL IMAGING SYSTEM AND METHOD

(71) Applicant: HUAZHONG UNIVERSITY OF SCIENCE AND TECHNOLOGY, Hubei (CN)

(72) Inventors: Fan Wang, Hubei (CN); Yangqin Fang, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 674 days.

(21) Appl. No.: 16/982,599

(22) PCT Filed: Nov. 21, 2019

(86) PCT No.: PCT/CN2019/119958
§ 371 (c)(1),
(2) Date: Sep. 21, 2020

(87) PCT Pub. No.: WO2021/082120
PCT Pub. Date: May 6, 2021

(65) Prior Publication Data
US 2022/0121022 A1    Apr. 21, 2022

(30) Foreign Application Priority Data
Oct. 28, 2019    (CN) .......................... 201911040698.9

(51) Int. Cl.
*G02B 21/22* (2006.01)
*G02B 21/08* (2006.01)
(Continued)

(52) U.S. Cl.
CPC .......... *G02B 21/22* (2013.01); *G02B 21/082* (2013.01); *G02B 21/26* (2013.01); *G06T 17/00* (2013.01)

(58) Field of Classification Search
CPC ...... G02B 21/22; G02B 21/082; G02B 21/26; G02B 21/08; G02B 21/365; G06T 17/00
See application file for complete search history.

(56) References Cited

U.S. PATENT DOCUMENTS

2014/0194690 A1*  7/2014  Wong ................... G06V 20/693
                                                                    382/128
2016/0091706 A1*  3/2016  Raghunathan ......... G02B 21/14
                                                                     348/46
(Continued)

FOREIGN PATENT DOCUMENTS

CN           2751299          1/2006
CN       100353268 C    * 12/2007
(Continued)

OTHER PUBLICATIONS

Computed stereo lensless X-ray imaging J. Duarte , R. Cassin , J. Huijts, B. Iwan, F. Fortuna, L. Delbecq, H. Chapman, M. Fajardo, M. Kovacev W. Boutu and H. Merdji Nature Photoniccs vol. 13 Jul. 2019 (Year: 2019).*
(Continued)

*Primary Examiner* — Mustak Choudhury
(74) *Attorney, Agent, or Firm* — JCIPRNET (57) ABSTRACT

A high-speed stereo 3D multimodal imaging system including a beam splitter, a pair of mirrors, a tight focus lens, a microscope stage, an imaging lens, a large area array detector, and a true 3D imaging module is provided. The beam splitter is configured to generate near-infrared ultrafast pulsed laser sub-beams with different angles. The mirrors respectively reflect the beams. The tight focus lens tightly focuses the beams onto a 3D micro-nanoscale sample, which can be carried and three-dimensionally displaced by the microscope stage. The imaging lens collects signals generated due to scattering of the tightly focused beams that are irradiated onto the sample so as to obtain two 2D images. The large area array detector simultaneously detects the two 2D images so that the true 3D imaging module can perform a true 3D imaging according to the detected 2D images. A high-speed stereo 3D multimodal imaging method is also provided.

12 Claims, 2 Drawing Sheets

(51) Int. Cl.
*G02B 21/26* (2006.01)
*G06T 17/00* (2006.01)

(56) References Cited

U.S. PATENT DOCUMENTS

2016/0370169 A1* 12/2016 Zhou ................. G01B 9/02028
2020/0242735 A1*  7/2020 Dai  ..................... G02B 21/367

FOREIGN PATENT DOCUMENTS

| CN | 104330398 | 2/2015 |
| CN | 108971747 | 12/2018 |
| CN | 109597195 | 4/2019 |
| JP | 2001108904 | 4/2001 |

OTHER PUBLICATIONS

"International Search Report (Form PCT/ISA/210) of PCT/CN2019/119958," dated May 29, 2020, pp. 1-5.
Leonardo De-Maeztu, et al., "Linear stereo matching," 2011 International Conference on Computer Vision, Nov. 2011, pp. 1-8.
J. Duarte, et al., "Computed stereo lensless X-ray imaging," Nature Photonics, vol. 13, Jul. 2019, pp. 1-7.

* cited by examiner

HIGH-SPEED STEREO 3D MULTIMODAL IMAGING SYSTEM AND METHOD

CROSS-REFERENCE TO RELATED APPLICATION

This application is a 371 of international application of PCT application Ser. No. PCT/CN2019/119958, filed on Nov. 21, 2019, which claims the priority benefit of China application no. 201911040698.9, filed on Oct. 28, 2019. The entirety of each of the above mentioned patent applications is hereby incorporated by reference herein and made a part of this specification.

BACKGROUND

Technical Field

The invention belongs to the optical detection field with computer stereo technology, and more specifically, relates to a high-speed stereo 3D multimodal imaging system and method.

Description of Related Art

In the field of noninvasive imaging, a multiphoton spectroscopic microscopy technology based on Coherent anti-Stokes Raman Scattering (CARS) is a powerful tool to observe the microscopic world. This technology provides the signals for imaging by detecting specific vibrations of target molecules or solid lattices, and greatly improves the sensitivity and accuracy of detection through nonlinear optical processes. CARS can simultaneously combine other modal nonlinear spectra (e.g., two-photon excited fluorescence (TPEF), second harmonic generation (SHG), third harmonic generation (THG) and the like) to form a multimodal nonlinear spectroscopic imaging technology, which can simultaneously analyze the physical and chemical properties of micro-nanoscale samples in a single experiment. At the same time, the multimodal nonlinear spectroscopic imaging technology is inherently provided with 3D imaging capabilities. However, the existing multimodal nonlinear spectral imaging technology faces severe challenges in achieving ultrafast 3D imaging. (1) The current 3D imaging technology is mainly based on computed tomography, which requires multiple rotations of the sample faced to the illumination source or focus tomography at different depths so that a full set of 2D projections can be completed and recombined to form a 3D image. However, this technology requires hundreds of views, or huge time-consuming and large-dose irradiation, making this technology hardly feasible for imaging ultrafast processes or dose-sensitive samples. (2) In order to reduce the number of measurements, a rapid 3D perception imaging method of the human brain based on the principle of processing the binocular parallax in the cortical area has been proposed. However, the main disadvantage of this 3D imaging method is that the 3D perception effect of the human brain is purely physiological, and there is no quantitative depth information; in addition, in order to achieve cognitive 3D reconstruction, the angle between two 2D views must be small, which limits the gain of structural information.

In summary, rather than requiring to rotate the sample at multiple angles for multiple observations, the existing true 3D imaging methods have limited imaging conditions, complicated operation, resulting in slow imaging speed and difficulties in obtaining 3D object depth information quantitatively. In the literature, ptychotomography can be used for ultra-high resolution 3D imaging. Nonetheless, Ptychotomography is also very demanding in terms of the number of projections required. At the same time, this technology requires a large number of identical samples and generates a large amount of data that need to be classified and combined to provide a consistent set of 3D data. Although Miao et al. also proposed techniques for retrieving 3D structures from single-order diffraction patterns, they work in limited situations, rely heavily on prior knowledge of the sample, and thus have too much imaging limitations.

SUMMARY

For the problems of slow 3D imaging speed, difficulty in measuring the depth of field, and harsh imaging conditions in the prior art, the invention provides a high-speed 3D multimodal imaging system and method, which aims to adjust the incident angle of the light to the sample by dividing the light into two sub-beams, and realize high-speed 3D imaging with the help of computer stereo imaging technology. Accordingly, only one measurement is required to obtain 3D stereo depth information.

To achieve the above objective, according to a first aspect of the invention, a high-speed stereo 3D multimodal imaging system is provided, and the system includes:
  a beam splitter, configured to generate first and second near-infrared femtosecond pulsed laser sub-beams with different angles;
  a pair of plane mirrors with adjustable rotation angles, respectively configured to reflect first and second near-infrared ultrafast pulsed laser sub-beams;
  a tight focus lens, configured to tightly focus the first and the second near-infrared femtosecond pulsed laser sub-beams onto a 3D micro-nanoscale sample;
  a microscope stage, configured to carry the 3D micro-nanoscale sample and three-dimensionally displace the sample;
  an imaging lens, configured to collect multimodal nonlinear spectral signals generated by the sample due to scattering after the sample is irradiated by the first and the second near-infrared femtosecond pulsed laser sub-beams that are tightly focused so as to obtain two 2D images;
  a large area array detector, configured to simultaneously detect the two 2D images; and
  a true 3D imaging module, configured to perform a true 3D imaging according to the two detected 2D images.

To achieve the above objective, according to a second aspect of the invention, a high-speed stereo 3D multimodal imaging system is provided, and the system includes:
  a beam splitter, configured to generate first and second near-infrared femtosecond pulsed laser sub-beams with different angles;
  a pair of plane mirrors with adjustable rotation angles, respectively configured to reflect first and second near-infrared ultrafast pulsed laser sub-beams;
  a tight focus lens, configured to tightly focus the first and the second near-infrared femtosecond pulsed laser sub-beams onto a 3D micro-nanoscale sample;
  a microscope stage, configured to carry the 3D micro-nanoscale sample and three-dimensionally displace the sample;
  an imaging lens, configured to collect multimodal nonlinear spectral signals generated by the sample due to scattering after the sample is irradiated by the first and the second near-infrared femtosecond pulsed laser sub-beams that are tightly focused so as to obtain two 2D images;

a filter, configured to select a single spectrum from the multimodal nonlinear spectral signals, and obtain monochromatic 2D images corresponding to the single spectrum;

a large area array detector, configured to simultaneously detect the two monochromatic 2D images corresponding to the single spectrum; and a true 3D imaging module, configured to, after performing one detection on each of target spectrums, superimpose each of monochromatic images formed by the target spectrums to form a multimodal color 2D view, and perform a true 3D imaging according to the two superimpose multimodal color 2D views.

Preferably, the beam splitter is a three-sided reflection prism.

Specifically, suitable conditions including a beam wavelength range, a laser energy, and a phase matching are selected according to a feature of the sample so that a strongest signal light is generated under a selected beam irradiation.

Preferably, the microscope stage is a nano piezoelectric displacement platform.

Preferably, the imaging system obtains the depth information of the 3D sample at one time through a fast bilateral stereo vision algorithm.

To achieve the above objective, according to a third aspect of the invention, a high-speed stereo 3D multimodal imaging method is provided, and the method includes the following steps:

S1: mounting a 3D micro-nano sample onto a microscope stage;

S2: selecting an excitation beam required for a multimodal nonlinear spectral imaging;

S3: splitting a selected laser beam to obtain first and second near-infrared femtosecond pulsed laser sub-beams with different angles;

S4: passing first and second near-infrared femtosecond pulsed laser sub-beams respectively through reflectors with adjustable rotation angles, adjusting the rotation angles of the reflectors so that the reflected first and second near-infrared femtosecond pulsed laser sub-beams are irradiated onto the sample through a tight focus lens respectively;

S5: adjusting a position of a stage so that the sample is at a focal plane of the tight focus lens and the irradiated micro-nano sample generates first and second nonlinear spectral signals;

S6: collecting multimodal nonlinear spectral signals generated by the sample due to scattering after the sample is irradiated by the first and the second near-infrared femtosecond pulsed laser sub-beams that are tightly focused so as to obtain two 2D images, and simultaneously detecting the two 2D images in an optimal detection mode of a large area array detector; and S7: based on the detected two 2D images, constructing a stereo 3D imaging while obtaining the depth information of the 3D sample.

To achieve the above objective, according to a fourth aspect of the invention, a high-speed stereo 3D multimodal imaging method is provided, and the method includes the following steps:

S1: mounting a 3D micro-nano sample onto a microscope stage;

S2: selecting an excitation beam required for a multimodal nonlinear spectral imaging;

S3: splitting a selected laser beam to obtain first and second near-infrared femtosecond pulsed laser sub-beams with different angles;

S4: passing first and second near-infrared femtosecond pulsed laser sub-beams respectively through reflectors with adjustable rotation angles, adjusting the rotation angles of the reflectors so that the reflected first and second near-infrared femtosecond pulsed laser sub-beams are irradiated onto the sample through a tight focus lens respectively;

S5: adjusting a position of a stage so that the sample is at a focal plane of the tight focus lens and the irradiated micro-nano sample generates first and second nonlinear spectral signals;

S6: collecting multimodal nonlinear spectral signals generated by the sample due to scattering after the sample is irradiated by the first and the second near-infrared femtosecond pulsed laser sub-beams that are tightly focused;

S7: according to a selected modal imaging, selecting a filter with a suitable wavelength to perform a monochromatic imaging representing a single modal to obtain two 2D images, and simultaneously detecting the two 2D images in an optimal detection mode of a large area array detector;

S8: according to application requirements, superimposing each of 2D images of single modal into a 2D multimodal image; and S9: based on the detected two 2D images, constructing a stereo 3D image while obtaining the depth information of the 3D sample.

In general, the above technical solutions conceived by the invention have the following beneficial effects:

(1) For the problem of slow 3D imaging speed in the prior art, the invention uses a combination of the plane mirror with an adjustable rotation angle and the beam splitter to split the laser beam into two sub-beams. Because the speed of changing the incident light angle of the sample is much faster than the speed of mechanically rotating the sample, the 3D image of the sample can be obtained by one observation without rotating the sample. Accordingly, the observation of the femtosecond time frame process of the 3D morphology and chemical characteristics of the sample can be realized.

(2) For the problem that the 3D depth of field in the prior art is difficult to detect, the invention uses a computer stereo algorithm. Because the computer stereo algorithm obtains quantitative depth of field information through the angle difference between two views, the 3D depth of field can be accurately and quantitatively measured.

(3) For the problem of harsh imaging conditions in the prior art, the invention adopts a large area array detector with 2D views for computer stereo imaging. Because the area of the entire detector is larger than that of the two conventional stereo lenses on the market and the computer stereo algorithm, the range of the angle difference between the two views can be very wide and flexible.

(4) For the problem of the complex optical path of non-destructive imaging in the prior art, the invention adopts a multimodal spectroscopic microscopic imaging technology based on the nonlinear process of near-infrared ultrafast lasers. Because the light source used in the multimodal nonlinear imaging extends from ultraviolet to near-infrared wavelengths, commercial ultrafast lasers with near-infrared wavelengths can be used.

BRIEF DESCRIPTION OF THE DRAWINGS

Throughout the drawings, the same reference numerals in the accompanying drawings denote the same elements or structures, wherein.

Figure 1:
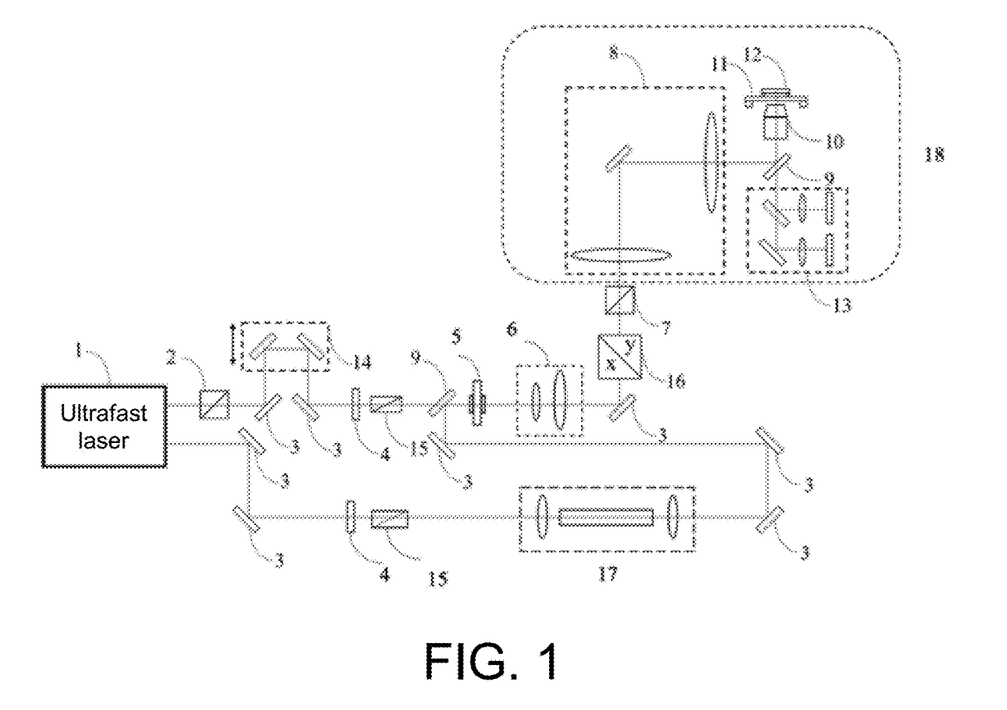
FIG. 1 is a schematic structure diagram of a multimodal nonlinear optical microscopy imaging system in the prior art.
Figure 2:
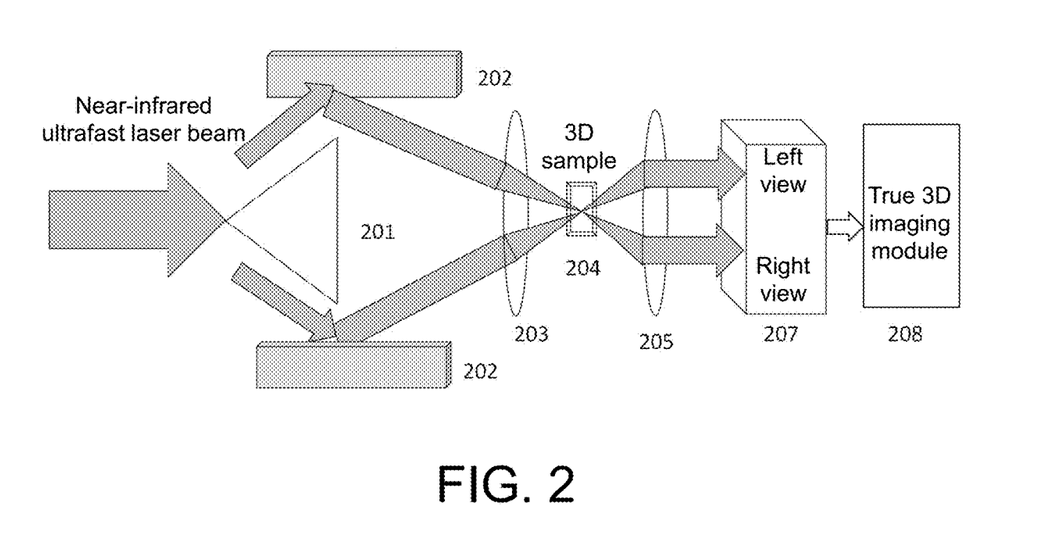
FIG. 2 is a schematic structural diagram of a first high-speed stereo 3D multimodal imaging system provided by an embodiment of the invention.
Figure 3:
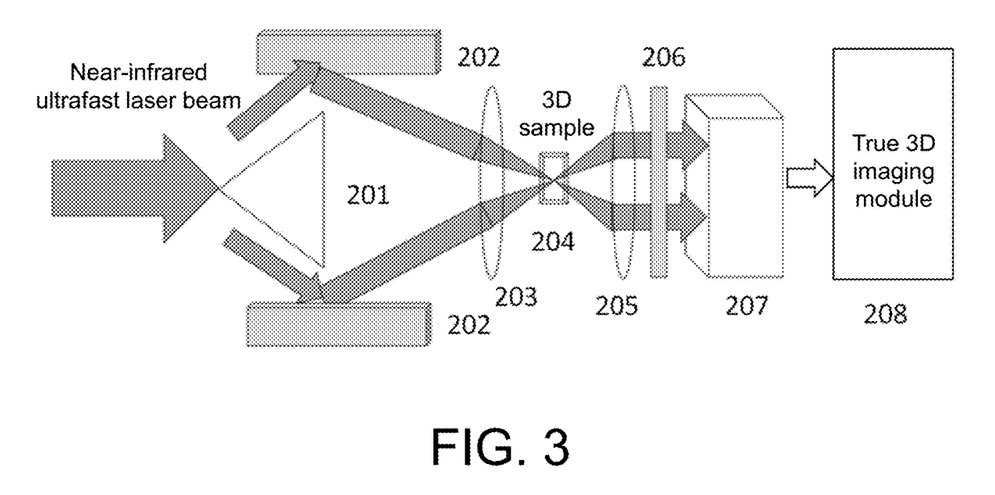
FIG. 3 is a schematic structural diagram of a second high-speed stereo 3D multimodal imaging system provided by an embodiment of the invention.

1 is a dual output ultrafast laser; 2 is a non-polarized beam splitter; 3 is a coated reflective mirror; 4 is a half-wave plate; 5 is a frequency modulator; 6 is a beam expander; 7 is a polarized beam combiner; 8 is 4F system; 9 is a dichroscope; 10 is a micro objective lens; 11 is a 2D electric displacement platform; 12 is a 3D nano piezoelectric displacement platform; 13 is a probe connected to an imaging spectrometer; 14 is a delay line; 15 is Glan prism; 16 is a 2D polarizer; 17 is a photonic crystal fiber system; 18 is an optical transmission and optical detection module, composed of 8, 9, 10, 11, 12, and 13;

201 is a light splitting prism; 202 is a pair of flat mirrors with adjustable angles; 203 is a tight focus lens; 204 is a stage; 205 is an imaging lens; 206 is a filter; 207 is a large area array detector; 208 is a true 3D image algorithm module.

DESCRIPTION OF THE EMBODIMENTS

In order to describe the objective, technical solution and advantages of the invention more clearly, the invention is described in detail below with reference to accompany drawings and embodiments. It should be noted that, the embodiments specifically described here are merely used to describe the invention rather than limit the invention. Further, the technical features involved in various embodiments of the invention described below may be combined together as long as they do not constitute a conflict with each other.

As shown in FIG. 1, the prior art has disclosed a multimodal nonlinear optical microscopy imaging system device, which includes:

a dual output ultrafast laser 1, configured to generate a femtosecond laser radiation source;
a non-polarized beam splitter 2, configured to prepare an extended beam splitting for other purposes such as laser processing;
a coated mirror 3, configured to change the laser propagation direction;
a half-wave plate 4, configured to change a laser polarization state;
a frequency modulator 5, configured to adjust a laser pulse frequency;
a beam expander 6, configured to collimate an incident laser beam to make a focal spot radius of a focused laser smaller after entering a microscope;
a polarization beam combiner 7, configured to prepare an expansion for laser inputs in other directions;
a 4F system 8, configured to conjugate spot;
a dichroscope 9, configured to reflect a laser whose wavelength is greater than a cut-off wavelength and project a laser whose wavelength is less than the cut-off wavelengths;
a micro objective lens 10, usually having a high numerical aperture value for meeting a tight focus condition of phase matching.
a 2D electric displacement platform 11, configured to two-dimensionally move samples;
a 3D nano piezoelectric displacement platform 12, configured to three-dimensionally move samples;
a probe 13 connected to an imaging spectrometer, composed of an imaging lens and a filter, and configured to collect spectrum and imaging;
a delay line 14, configured to generate a time difference between two pulse lasers.
a Glan prism 15, configured to adjust a laser power together with the half-wave plate;
a 2D polarizer 16, configured to conduct a 2D plane scan in the X-Y direction;
a photonic crystal fiber system 17, configured to generate a continuous wavelength laser;
an optical transmission and optical detection module 18, composed of 8, 9, 10, 11, 12, and 13, and configured to transmit and detect a nonlinear spectral signal and images generated after the laser passes through a sample.

The device introduces a near-infrared ultrafast laser (1) through an optical transmission module (2 to 8 and 14 to 16) into the microscope module (9 to 13) to image the sample by irradiation. After meeting the conditions of phase matching, the focused near-infrared ultrafast laser will excite nonlinear processes (including CARS, TPEF, SHG, THG, etc.) of the sample. By collecting nonlinear signals through the imaging lens, and detecting the spectrum and imaging of the nonlinear signals through an imaging spectrometer, a multimodal nonlinear spectral imaging is realized.

The invention proposes new imaging system and method based on the principle of computer stereo imaging. Two 2D views may be generated by a single measurement of multimodal nonlinear spectroscopy, and a 3D image may be generated from the two 2D views through a computer algorithm. The invention can greatly reduce observation time for a 3D samples and damage to radiation-sensitive samples. The angle between the two 2D views is very flexible, and the depth information of the sample can be obtained quantitatively. Therefore, it is a promising technology that can be used for the 3D chemical imaging characterization of nano-scale fast time frames.

As shown in FIG. 2, the invention provides a high-speed stereo 3D multimodal imaging system. This system can replace the module 18 in FIG. 1. The system includes the followings.

A beam splitter 201 is configured to generate first and second near-infrared femtosecond pulsed laser sub-beams with different angles.

Suitable conditions including a beam wavelength range, a laser energy, and a phase matching are selected according to a feature of the sample so that a strongest signal light (detection light) is generated under a selected beam irradiation (incident light). Among them, the wavelength selection based on Coherent anti-Stokes Raman Scattering effect detection needs to satisfy the simultaneous resonance relationship between frequency difference of dichrome laser and Raman active molecules of the sample, and the two beams must be synchronized and combined in parallel. In order to meet the experimental conditions that produce the nonlinear process, a super-powered laser is required. Meanwhile, considering the damage to the sample, a laser irradiation with near-infrared wavelength is required, and thus a near-infrared ultrafast laser beam is required. So-called ultrafast is generally defined as femtosecond or picosecond.

In the invention, the beam splitter is preferably a three-sided reflection prism. Based on the principle of computer stereo imaging, the three-sided reflection prism combined with two flat mirrors with adjustable rotation angles are used to divide a laser beam into two laser beams with two incident angles. A three-sided prism is a combination of achromatic mirror-increasing planes, and the reflected beam quality is better than that of ordinary prisms.

A pair of plane mirrors 202 with adjustable rotation angles are respectively configured to reflect first and second near-infrared ultrafast pulsed laser sub-beams.

In order to avoid rotating the sample during the 3D imaging process, in this invention, the incident light angle of the sample can be adjusted by, specifically, the pair of plane mirrors 202 with the adjustable rotation angles.

A tight focus lens 203 is configured to tightly focus the first and the second near-infrared femtosecond pulsed laser sub-beams onto a 3D micro-nanoscale sample.

Because the tight focus lens can meet the phase matching required to produce the nonlinear process, in the invention, the tight focus lens is used to focus the first and the second near-infrared femtosecond pulsed laser sub-beams onto the 3D micro-nanoscale sample. The light passing through the tight focus lens satisfies the condition of phase matching and generates a nonlinear spectrum signal. The micro-nano scale refers to the nanometer level or the micrometer level. A combination of the near-infrared ultrafast laser and the tight focus lens can realize the multimodal for Coherent Raman, second harmonic generation (SHG), third harmonic generation (THG), two-photon excited fluorescence (TPEF) and the like.

A microscope stage 204 is configured to carry the 3D micro-nanoscale sample and three-dimensionally displace the sample.

The microscope stage is generally a nano piezoelectric displacement platform.

An imaging lens 205 is configured to collect multimodal nonlinear spectral signals generated by the sample due to scattering after the sample is irradiated by the tightly focused first and the second near-infrared femtosecond pulsed laser sub-beams to obtain two 2D images.

A large area array detector 207 configured to simultaneously detect the two 2D images.

The two 2D images detected are left view and right view respectively.

In order to detect the nonlinear spectrum signal at a wide angle, the invention preferably uses the large area array detector (more preferably, an sCMOS or EMCCD camera with no less than 1024×1024 pixels). In a corrected optimal detection mode, a large area array camera combined with the imaging lens is used to collect the multimodal nonlinear spectral signals.

Each sub-beam irradiates the sample to form one 2D image, so two 2D images can be obtained at one time. The two images generated by incident illumination at different incident angles are captured by the same imaging lens and an image detector. A combination of a large area zero-aberration imaging lens and the same large area array detector replaces the two lenses required in a general stereo imaging to generate a pair of stereo images. Compared with a fixed stereo imaging angle that requires two lenses, this method has a flexible imaging angle and increases a position difference between center points of the two 2D images at the same time. A detection imaging mode can be divided into forward or backward detection.

A true 3D imaging module 208 is configured to perform a true 3D imaging according to the two detected 2D images.

The 3D imaging system can obtain the depth information of the 3D sample at one time through a stereo imaging algorithm. Accordingly, morphology information of 3D micro-nano samples can be revealed in real time. In order to integrate two 2D views into a true 3D image for reflecting the actual object depth information, the invention prefers the Fast Bilateral stereo vision algorithm proposed by Professor Stefano Mattoccia at the top international conference on computer vision ICCV 2011 (L. De-Maeztu, S. Mattoccia, A. Villanueva, R. Cabeza, "Linear stereo matching", 13th International Conference on Computer Vision). The algorithm first performs a view parameter correction, a standardization, a stereo correlation, and a triangulation processing on the two 2D images with the different viewing angles, and calculates the actual 3D depth of field of the object through a viewing angle difference of the 2D images.

The invention provides a high-speed stereo 3D multimodal imaging method, and the method includes the following steps:

S1: mounting a 3D micro-nano sample onto a microscope stage;

S2: selecting an excitation beam required for a multimodal nonlinear spectral imaging;

S3: splitting a selected laser beam to obtain first and second near-infrared femtosecond pulsed laser sub-beams with different angles;

S4: passing first and second near-infrared femtosecond pulsed laser sub-beams respectively through reflectors with adjustable rotation angles, adjusting the rotation angles of the reflectors so that the reflected first and second near-infrared femtosecond pulsed laser sub-beams are irradiated onto the sample through a tight focus lens respectively;

S5: adjusting a position of a stage so that the sample is at a focal plane of the tight focus lens and the irradiated micro-nano sample generates first and second nonlinear spectral signals;

S6: collecting multimodal nonlinear spectral signals generated by the sample due to scattering after the sample is irradiated by the first and the second near-infrared femtosecond pulsed laser sub-beams that are tightly focused so as to obtain two 2D images, and simultaneously detecting the two 2D images in an optimal detection mode of a large area array detector;

S7: based on the detected two 2D images, constructing a stereo 3D imaging while obtaining depth information of the 3D sample.

The above-mentioned system and method are suitable for detecting a single spectrum at a time, and the formed 3D image has a black and white effect. The position with the spectral signal is white, and the position without the spectral signal is black. This system is not directly applicable to a color 3D imaging. Therefore, the invention proposes another 3D multimodal imaging system, which further includes a filter for performing a monochromatic imaging on each of target spectrums. Monochromatic images formed by the different target spectrums are superimposed to form multimodal color 2Ds views, so as to finally achieve the color 3D imaging.

As shown in FIG. 3, the invention proposes a high-speed stereo 3D multimodal imaging system. This system can replace the module 18 in FIG. 1. The system includes the followings.

A beam splitter 201 is configured to generate first and second near-infrared femtosecond pulsed laser sub-beams with different angles.

A pair of plane mirrors 202 with adjustable rotation angles are respectively configured to reflect first and second near-infrared ultrafast pulsed laser sub-beams.

A tight focus lens 203 is configured to tightly focus the first and the second near-infrared femtosecond pulsed laser sub-beams onto a 3D micro-nanoscale sample.

A microscope stage 204 is configured to carry the 3D micro-nanoscale sample and three-dimensionally displace the sample.

An imaging lens 205 is configured to collect multimodal nonlinear spectral signals generated by the sample due to scattering after the sample is irradiated by the tightly focused first and the second near-infrared femtosecond pulsed laser sub-beams to obtain two 2D images.

A filter 206 is configured to select a single spectrum from the multimodal nonlinear spectral signals, and obtain monochromatic 2D images corresponding to the single spectrum.

The filter is required for a spectral detection imaging. The filter is generally a filter for ultrafast lasers with good monochromaticity, and its size can be flexibly selected according to the size of the sample.

A large area array detector 207 is configured to simultaneously detect the two monochrome 2D images corresponding to the single spectrum.

A true 3D imaging module 208 is configured to, after performing one detection on each of target spectrums, superimpose each of monochromatic images formed by the target spectrums to form a multimodal color 2D view, and perform a true 3D imaging according to the two superimpose multimodal color 2D views.

Due to the beam splitting prisms used to generate double beams in combination with the computer 3D imaging technology, there is no need to perform multiple tomography at different angles or different depths on the sample, which is simpler and faster than traditional 3D imaging technology. The invention proposes a multimodal nonlinear spectral imaging technology to be combined with a computer stereo 3D technology to form high-speed real-time 3D imaging, which has the function of fully characterizing the multi-component of the 3D sample, and can reach a nanometer spatial resolution and a femtosecond (attosecond) time resolution.

The invention provides a high-speed stereo 3D multimodal imaging method, and the method includes the following steps:

S1: mounting a 3D micro-nano sample onto a microscope stage;

S2: selecting an excitation beam required for a multimodal nonlinear spectral imaging;

S3: splitting a selected laser beam to obtain first and second near-infrared femtosecond pulsed laser sub-beams with different angles;

S4: passing first and second near-infrared femtosecond pulsed laser sub-beams respectively through reflectors with adjustable rotation angles, adjusting the rotation angles of the reflectors so that the reflected first and second near-infrared femtosecond pulsed laser sub-beams are irradiated onto the sample through a tight focus lens respectively;

S5: adjusting a position of a stage so that the sample is at a focal plane of the tight focus lens and the irradiated micro-nano sample generates first and second nonlinear spectral signals;

S6: collecting multimodal nonlinear spectral signals generated by the sample due to scattering after the sample is irradiated by the tightly focused first and the second near-infrared femtosecond pulsed laser sub-beams that are tightly focused;

S7: according to a selected modal imaging, selecting a filter with a suitable wavelength to perform a monochromatic imaging representing a single modal to obtain two 2D images, and simultaneously detecting the two 2D images in an optimal detection mode of a large area array detector;

S8: according to application requirements, superimposing each of 2D images of single modal into a 2D multimodal image;

S9: based on the detected two 2D images, constructing a stereo 3D image while obtaining the depth information of the 3D sample.

Embodiment 1—Black and White 3D Image Formed by Coherent Anti-Stokes Raman Scattering Modal The method will be described in detail with Coherent anti-Stokes Raman Scattering spectroscopy to detect 3D micro-nano samples based on femtosecond two-photon polymerization as an example.

(1) A pure photoresist is used to prepare a 3D micro-nano structure on SiO2 or a glass substrate by femtosecond laser direct writing.

(2) A dual output femtosecond laser is turned on, a first output wavelength is tuned to 780 nm, the other laser is adjusted to 1040 nm, the two photosynthesis beams are synchronized, and a laser energy that can produce Coherent anti-Stokes Scattering (CARS) is selected.

(3) The combined laser beam is split through a three-sided prism, and the split beam is divided into the first and second sub-beams.

(4) A rotation angle of the reflector is adjusted, and the reflected first and second sub-beams are irradiated onto the sample respectively through the tight focus lens.

(5) A position of the stage is adjusted so that the sample is at the focal plane of the tight focus lens and the irradiated micro-nano sample can generate the nonlinear spectral signals.

(6) A detector is turned on for setting parameters. In the corrected optimal detection mode, the large area array camera combines an imaging convex lens to collect the spectral signal light, and form the 2D images projected by scattering of the nonlinear spectral signals from the sample. Each of the sub-beams irradiates the sample to form one 2D image, so the two 2D images can be obtained at one time.

(7) A stereo 3D imaging is conducted according to the 3D imaging algorithm software, a depth map of the 3D sample is obtained, and a 3D shape of the sample is revealed.

Embodiment 2—Single Spectrum (Monochromatic) Imaging Formed by Second Harmonic Modal The method will be described in detail with a single nonlinear spectrum (e.g., second harmonic generation (SHG)) to detect a ZnO nanowire micro-nano structure oriented three-dimensionally assembled by femtosecond two-photon laser as an example.

(1) A photoresist doped with ZnO nanowires is prepared, and a 3D ZnO nanowire array structure is prepared on SiO2 or glass substrate by femtosecond laser direct writing.

(2) A dual output femtosecond laser is turned on, a first output wavelength is tuned to 800 nm, and a laser energy suitable for second harmonic generation (SHG) is selected.

(3) The combined laser beam is split through a three-sided prism, and the split beam is divided into the first and second sub-beams.

(4) A rotation angle of the reflector is adjusted, and the reflected first and second sub-beams are irradiated onto the sample respectively through the tight focus lens.

(5) A position of the stage is adjusted so that the sample is at the focal plane of the tight focus lens and the irradiated micro-nano sample can generate the nonlinear spectral signals.

(6) A detector is turned on for setting parameters. A large area array camera is prepared to collect the spectral signal light in combination with an imaging convex lens. Each of the sub-beams irradiates the sample to form one 2D image, so the two 2D images can be obtained at one time.

(7) According to a selected modal imaging, a filter with a suitable wavelength (e.g. 400 nm) is selected to perform a monochrome imaging of a single modal to obtain two 2D images, and the two 2D images are simultaneously detected in an optimal detection mode of a large area array detector.

(8) The 2D images of single modal are output as a 2D multimodal image.

(9) A stereo 3D color imaging is conducted according to the 3D imaging algorithm software, a depth map of the 3D sample is obtained, and a 3D shape of the sample is revealed.

Embodiment 3—Multi-Spectral (Color) Imaging Formed by Multimodal

The method will be described in detail with the process of multimodal nonlinear spectroscopy detection based on femtosecond two-photon laser polymerization directed assembly of doped (such as: ZnO nanowire) photoresist samples as an example.

(1) A doped ZnO nanowire photoresist is prepared, and a 3D micro-nano structure is formed in situ on SiO2 or glass substrate by femtosecond laser direct writing.

(2) A dual output femtosecond laser is turned on, a first output wavelength is tuned to 780 nm, the other laser is adjusted to 1040 nm, the two photosynthesis beams are synchronized, and a laser energy that can produce Coherent anti-Stokes (CARS), second harmonic generation (SHG) and two-photon excited fluorescence (TPEF) is selected.

(3) The combined laser beam is split through a three-sided prism, and the split beam is divided into the first and second sub-beams.

(4) A rotation angle of the reflector is adjusted, and the reflected first and second sub-beams are irradiated onto the sample respectively through the tight focus lens.

(5) A position of the stage is adjusted so that the sample is at the focal plane of the tight focus lens and the irradiated micro-nano sample can generate the nonlinear spectral signals.

(6) A detector is turned on for setting parameters. A large area array camera is prepared to collect the spectral signal light in combination with an imaging convex lens. Each of the sub-beams irradiates the sample to form one 2D image, so the two 2D images can be obtained at one time.

(7) According to a selected modal imaging, a filter with a suitable wavelength is selected to perform a monochrome imaging representing a single modal to obtain two 2D images, and the two 2D images are simultaneously detected in an optimal detection mode of a large area array detector.

(8) The 2D images of multimodal (CARS, SHG and TPEF) are superimposed into a 2D multimodal image;

(9) A stereo 3D color imaging is conducted according to the 3D imaging algorithm software, a depth map of the 3D sample is obtained, and a 3D shape of the sample is revealed.

Those skilled in the art will readily appreciate that any modifications, equivalent substitutions and improvements made within the spirit and scope of the invention are intended to be included within the scope of the invention. Any modifications, equivalent substitutions and improvements made within the spirit and scope of the invention are intended to be included within the scope of the invention.

What is claimed is:

1. A high-speed stereo 3D multimodal imaging system, comprising:
    a beam splitter, configured to generate first and second near-infrared ultrafast pulsed laser sub-beams with different angle;
    a pair of plane mirrors with adjustable rotation angles, respectively configured to reflect the first and second near-infrared ultrafast pulsed laser sub-beams;
    a focus lens, disposed on optical paths of the first and second near-infrared ultrafast pulsed laser sub-beams that are respectively reflected by the pair of plane mirrors and configured to tightly focus the first and the second near-infrared ultrafast pulsed laser sub-beams onto a 3D micro-nanoscale sample;
    a microscope stage, configured to carry the 3D micro-nanoscale sample and three-dimensionally displace the 3D micro-nanoscale sample;
    an imaging lens, disposed on optical paths of the first and second near-infrared ultrafast pulsed laser sub-beams that are tightly focused by the focus lens and configured to collect multimodal nonlinear spectral signals generated by the 3D micro-nanoscale sample due to scattering after the 3D micro-nanoscale sample is irradiated by the first and the second near-infrared ultrafast pulsed laser sub-beams that are tightly focused so as to obtain two 2D images each containing information of the 3D micro-nanoscale sample;
    a large area array detector, configured to simultaneously detect the two 2D images; and
    a true 3D imaging module, configured to perform a true 3D imaging according to the two detected 2D images.

2. The system of claim 1, wherein the beam splitter is a three-sided reflection prism.

3. The system of claim 1, wherein suitable conditions including a beam wavelength range, a laser energy, and a phase matching are selected according to a feature of the 3D micro-nanoscale sample so that a strongest signal light is generated under a selected beam irradiation.

4. The system of claim 1, wherein the microscope stage is a nano piezoelectric displacement platform.

5. The system of claim 1, wherein the imaging system obtains depth information of the 3D sample at one time through a fast bilateral stereo vision algorithm.

6. A high-speed stereo 3D multimodal imaging system, comprising:
    a beam splitter, configured to generate first and second near-infrared ultrafast pulsed laser sub-beams with different angles;
    a pair of plane mirrors with adjustable rotation angles, respectively configured to reflect the first and second near-infrared ultrafast pulsed laser sub-beams;

a focus lens, disposed on optical paths of the first and second near-infrared ultrafast pulsed laser sub-beams that are respectively reflected by the pair of plane mirrors and configured to tightly focus the first and the second near-infrared ultrafast pulsed laser sub-beams onto a 3D micro-nanoscale sample;

a microscope stage, configured to carry the 3D micro-nanoscale sample and three-dimensionally displace the 3D micro-nanoscale sample;

an imaging lens, disposed on optical paths of the first and second near-infrared ultrafast pulsed laser sub-beams that are tightly focused by the focus lens and configured to collect multimodal nonlinear spectral signals generated by the 3D micro-nanoscale sample due to scattering after the 3D micro-nanoscale sample is irradiated by the first and the second near-infrared ultrafast pulsed laser sub-beams that are tightly focused so as to generate two images beams for obtaining two 2D images each containing information of the 3D micro-nanoscale sample;

a filter, disposed on optical paths of the two images beams generated by the imaging lens and configured to select a single spectrum from the multimodal nonlinear spectral signals, and obtain monochrome 2D images corresponding to the single spectrum;

a large area array detector, configured to simultaneously detect the two monochrome 2D images corresponding to the single spectrum; and a true 3D imaging module, configured to, after performing one detection on each of target spectrums, superimpose each of monochrome images formed by the target spectrums to form a multimodal color 2D view, and perform a true 3D imaging according to the two superimpose multimodal color 2D views.

7. The system of claim 6, wherein the beam splitter is a three-sided reflection prism.

8. The system of claim 6, wherein suitable conditions including a beam wavelength range, a laser energy, and a phase matching are selected according to a feature of the 3D micro-nanoscale sample so that a strongest signal light is generated under a selected beam irradiation.

9. The system of claim 6, wherein the microscope stage is a nano piezoelectric displacement platform.

10. The system of claim 6, wherein the imaging system obtains depth information of the 3D sample at one time through a fast bilateral stereo vision algorithm.

11. A high-speed stereo 3D multimodal imaging method, comprising following steps of:
S1: mounting a 3D micro-nano sample onto a microscope stage;
S2: selecting an excitation beam required for a multimodal nonlinear spectral imaging;
S3: splitting a selected laser beam to obtain first and second near-infrared ultrafast pulsed laser sub-beams with different angles;
S4: passing the first and second near-infrared ultrafast pulsed laser sub-beams respectively through reflectors with adjustable rotation angles, adjusting the rotation angles of the reflectors so that the reflected the first and second near-infrared ultrafast pulsed laser sub-beams are irradiated onto the 3D micro-nanoscale sample through a focus lens respectively;
S5: adjusting a position of a stage so that the 3D micro-nanoscale sample is at a focal plane of the focus lens and the irradiated 3D micro-nano sample generates first and second nonlinear spectral signals;
S6: collecting, by an imaging lens, multimodal nonlinear spectral signals generated by the 3D micro-nanoscale sample due to scattering after the 3D micro-nanoscale sample is irradiated by the first and the second near-infrared ultrafast pulsed laser sub-beams that are tightly focused so as to obtain two 2D images each containing information of the 3D micro-nanoscale sample, and simultaneously detecting the two 2D images in an optimal detection mode of a large area array detector; and
S7: based on the detected two 2D images, constructing a stereo 3D imaging while obtaining depth information of the 3D sample.

12. A high-speed stereo 3D multimodal imaging method, comprising following steps of:
S1: mounting a 3D micro-nano sample onto a microscope stage;
S2: selecting an excitation beam required for a multimodal nonlinear spectral imaging;
S3: splitting a selected laser beam to obtain first and second near-infrared ultrafast pulsed laser sub-beams with different angles;
S4: passing the first and second near-infrared ultrafast pulsed laser sub-beams respectively through reflectors with adjustable rotation angles, adjusting the rotation angles of the reflectors so that the reflected first and second near-infrared ultrafast pulsed laser sub-beams are irradiated onto the 3D micro-nanoscale sample through a focus lens respectively;
S5: adjusting a position of a stage so that the 3D micro-nanoscale sample is at a focal plane of the focus lens and the irradiated 3D micro-nano sample generates first and second nonlinear spectral signals;
S6: collecting, by an imaging lens, multimodal nonlinear spectral signals generated by the 3D micro-nanoscale sample due to scattering after the 3D micro-nanoscale sample is irradiated by the first and the second near-infrared ultrafast pulsed laser sub-beams that are tightly focused;
S7: according to a selected modal imaging, selecting a filter with a suitable wavelength to be disposed between the imaging lens and a large area array detector to perform a monochrome imaging representing a single modal to obtain two 2D images each containing information of the 3D micro-nanoscale sample, and simultaneously detecting the two 2D images in an optimal detection mode of the large area array detector;
S8: according to application requirements, superimposing each of 2D images of single modal into a 2D multimodal image; and
S9: based on the detected two 2D images, constructing a stereo 3D image while obtaining depth information of the 3D sample.

* * * * *